United States Patent
Herman et al.

(10) Patent No.: US 8,563,663 B2
(45) Date of Patent: Oct. 22, 2013

(54) HEAT CURABLE COMPOSITION FOR COMPOSITE PARTS AND INTUMESCENT COATINGS

(75) Inventors: Serge Herman, Noeux les Mines (FR); Urbain Coudevylle, Salome (FR); Thierry Foussard, Lille (FR)

(73) Assignee: CCP Composites, Courbevoie (FR)

( * ) Notice: Subject to any disclaimer, the term of this patent is extended or adjusted under 35 U.S.C. 154(b) by 0 days.

(21) Appl. No.: 13/132,169

(22) PCT Filed: Dec. 2, 2009

(86) PCT No.: PCT/EP2009/008587
§ 371 (c)(1),
(2), (4) Date: Jun. 1, 2011

(87) PCT Pub. No.: WO2010/069465
PCT Pub. Date: Jun. 24, 2010

(65) Prior Publication Data
US 2011/0237711 A1    Sep. 29, 2011

(30) Foreign Application Priority Data
Dec. 18, 2008    (FR) ...................................... 08 07147

(51) Int. Cl.
*C08F 20/00*    (2006.01)

(52) U.S. Cl.
USPC ........... 525/445; 525/447; 525/448; 525/449; 524/186; 524/404; 524/414; 524/430; 524/437

(58) Field of Classification Search
USPC .......... 524/186, 404, 414, 430, 437; 525/445, 525/447, 448, 449
See application file for complete search history.

(56) References Cited

U.S. PATENT DOCUMENTS

| | | | |
|---|---|---|---|
| 3,741,929 A * | 6/1973 | Burton | 524/333 |
| 4,822,439 A * | 4/1989 | Gauchel et al. | 156/285 |
| 6,187,442 B1 * | 2/2001 | Lane et al. | 428/416 |
| 6,479,574 B1 * | 11/2002 | Greigger et al. | 524/414 |
| 7,655,724 B2 | 2/2010 | Robertson | |
| 2005/0215708 A1 | 9/2005 | Robertson | |

FOREIGN PATENT DOCUMENTS

| | | |
|---|---|---|
| BE | 868828 | 11/1978 |
| BE | 868828 A1 | 11/1978 |
| WO | 97/31056 A1 | 8/1997 |
| WO | 9731086 A1 | 8/1997 |
| WO | 0023495 A1 | 4/2000 |
| WO | 0129123 A1 | 4/2001 |

* cited by examiner

*Primary Examiner* — Robert Jones, Jr.
(74) *Attorney, Agent, or Firm* — Whyte Hirschboeck Dudek S.C.

(57) ABSTRACT

The invention relates to a heat curable composition for fire-resistant or intumescent composite parts, which is free of any halogen additive or halogen structure in the components thereof, and which comprises: a) 100 parts by weight of a dry resin, including a1) an unsaturated polyester having an acid index lower than 10 and/or a2) a vinyl ester; b) 40 to 200 parts by weight of a reactive thinner among ethylenically unsaturated monomers; c) 20 to 110 parts by weight of a thermal expansion agent selected from melamine and derivatives thereof, guanidine, glycine, urea, triisiocynurates, and azodicarbinamide; d) 0 to 250 parts by weight of aluminium trihydrate; e) 10 to 80 parts by weight of a carbonisation precursor agent selected from multifunctional polyols; f) 50 to 200 parts by weight of a compound selected from a phosphorus derivative and/or a boric acid derivative; g) optionally at least one metal oxide; h) optionally other additives and fillers; i) optionally reinforcements containing natural or synthetic fibres and related fabrics, wherein the acid component of the polyester a1) contains at least 60 mol % of acid and/or maleic anhydride and the polyol component contains at least 70 mol % of propylene glycol. The compositions can be used in the field of transport, building, public works, civil engineering and recreation or street furniture with intumescent composite parts or coatings that comply at least with criterion HL2 of the R1 requirement of prCEN/TS 45545-2:2008.

27 Claims, No Drawings

HEAT CURABLE COMPOSITION FOR COMPOSITE PARTS AND INTUMESCENT COATINGS

The present invention relates to thermosetting compositions, in particular for intumescent composite components, to a precursor composition for the preparation of the said thermosetting composition, to a preparation process, to uses of these thermosetting compositions, more particularly in the fields of transportation, the building industry, civil engineering and public works, leisure and street furniture, and also to the finished products, such as composite components, coatings, mastics, structural adhesives, gel coats (surface coatings) and top coats (finishing surface coatings), based on these compositions.

The use of materials based on thermosetting compositions in this field is increasing for reasons of savings in weight and energy for a high mechanical performance. Furthermore, the requirement of increasingly strict safety standards in this field of use intensifies the already major need to employ high performance materials having a significantly improved fire resistance in the absence of halogens and more particularly intumescent materials for increasingly specific applications.

The intumescent performance is difficult to achieve, in particular for a thermosetting composition, for various reasons related to the complexity of the phenomenon and also to the dependence of the overall intumescent nature on satisfying several more specific factors or performances which are difficult to reconcile a priori. The improvement in the intumescent behaviour according to the present invention for a candidate composite material thus requires, as for the thermosetting composition from which it results, that certain requirements and criteria, such as the following, be met:
- a significant softening capacity and a significant swelling capacity under the effect of the rise in the temperature, in order to be able to form an expanded shell which insulates from the source of heat and from oxygen,
- a satisfactory cohesive strength of the shell, which has to have a uniform and homogeneous expanded structure exhibiting good mechanical strength,
- an intumescent behaviour which satisfies at least the HL2 level and preferably the HL3 level according to the R1 requirement of Standard prCEN/TS 45545-2:2008, with absence of any halogen in the thermosetting composition and absence of any carcinogenic, mutagenic or toxic for reproduction (CMR) compound and with a reduction in the toxicity and in the opacity of the smoke generated,
- more particularly for laminated components, an intumescent behaviour independent of the quality of the face exposed to the fire.

More particularly still, for some preferred compositions, to be able to have:
- a stability on storage of the thermosetting composition resulting in a final composite material, having a stability expressed in terms of minimal change in the viscosity over a storage time of up to 2 months corresponding to a change of less than or equal to 15% with respect to the initial viscosity. This requirement is related to the ease of handling and of the processing of the thermosetting formulation during application,
- an M1F1 classification according to Standard NF EN ISO 16-101 with a formulation devoid of any halogen and of any carcinogenic, mutagenic or toxic for reproduction (CMR) compound and with a reduced toxicity and a reduced opacity of the smoke generated: M1 classification characterizing the flame propagation according to $q<2.5$ and F1 classification characterizing the opacity and the toxicity of the gaseous effluents according to $5<SI<20$.

In fact, the technical problem to be solved is a specific compromise, which is difficult to find, in terms of performance of the thermosetting compositions targeted, which must simultaneously exhibit an excellent fire resistance and an excellent heat resistance, with reduced toxicity and reduced opacity of the smoke generated, and also a satisfactory mechanical strength, without affecting either the application characteristics or the ease of application or the ease of processing of the said composition, with good wettability and good handling and storage properties. This compromise is only possible by a specific choice of constituents (components) of the said thermosetting composition and by the specific choice of their (specific) relative proportions. Preferably, the viscosity of the composition is stable over a storage time of at least 2 months with a variation not exceeding 15% with respect to the initial value. The viscosity of the composition can be and is an important characteristic for some targeted applications where the processing methods are varied, such as, for example contact moulding, spray moulding, wet compression moulding, centrifuging, filament winding, continuous impregnation, casting, pultrusion or by a closed mould technique, such as injection moulding or infusion or RTM (Resin Transfer Moulding).

WO 97/31056 describes thermosetting formulations of unsaturated polyesters for improving the fire resistance comprising, as essential fire-retardant components, melamine and a phosphorus compound. More particularly, these compositions exclude the presence of agents which promote the formation of a charred residue, otherwise known as "char source" agents. These compositions do not give an intumescent nature as an intumescent shield is not formed.

Despite the efforts undertaken in developing improved intumescent materials, no commercial product to date gives complete satisfaction in terms of intumescence according to the requirements defined above. However, the need still remains to improve the intumescent nature of the thermosetting compositions described in the state of the art. The specific solution of the present invention meets this need through the provision of a specific thermosetting composition having specific characteristics via a synergistic effect generated by the combination under specific conditions of the components of the thermosetting composition of the present invention.

The first subject-matter of the present invention is thus a specific thermosetting composition and more particularly a thermosetting composition, for fire-resistant or more particularly intumescent composite components, which is devoid (free) of any halogenated additive and of any halogenated structure in its components and which comprises:
a) per 100 parts by weight of a resin, which weight is expressed as weight of dry resin (without diluent), comprising or composed of:
  a1) at least one unsaturated polyester, having an acid number of less than 10, preferably not exceeding 8 and more preferably of less than 5, and/or
  a2) at least one vinyl ester, preferably selected from vinyl esters derived from epoxidized phenol/formaldehyde resins, more preferably derived from epoxy-novolac resins,
b) 40 to 200, preferably 50 to 180 and more preferably 60 to 160 parts by weight of at least one reactive diluent selected from ethylenically unsaturated monomers copolymerizable with the said resin, preferably selected from (meth)acrylic and/or vinyl and/or allyl monomers and more preferably with the said component b) comprising or composed of a component b1) comprising or composed of at least one aromatic vinyl or allyl monomer and optionally b) comprising or composed of a component b2) comprising or composed of at least one polyfunctional (meth)acrylic monomer with a functionality ranging from 2 to 4, c) 20 to 110, preferably from 25 to 100, parts by weight of at least one agent for expansion by thermal decomposition selected from: melamine and melamine derivatives, guanidine, glycine, urea, triisocyanurates or azodicarbonamide, preferably melamine and derivatives and more preferably melamine, d) 0 to 250, preferably from 0 to 175, parts by weight of aluminium trihydrate, e) 10 to 80, preferably 10 to 70, parts by weight of at least one agent which is a precursor of charring, otherwise known as "char source" agent, selected from: polyfunctional polyols, preferably with a functionality of at least 4, including alkoxylated polyfunctional polyols, and preferably selected from: sugars, starch, potato flour, pentaerythritol (PET) and/or derivatives of PET and/or erythritol and/or sorbitol, these derivatives of PET being alkoxylated pentaerythritol (PET), and/or di- and/or tripentaerythritol and more preferably the said component e) is selected from: pentaerythritol and/or derivatives of PET as defined above and more preferably still pentaerythritol and alkoxylated pentaerythritol, f) 50 to 200, preferably from 70 to 175, parts of a compound from: at least phosphorus derivative and/or at least one boric acid derivative, preferably ammonium borate, the said component f) preferably being a phosphorus derivative selected from: phosphonates and/or phosphates (which phosphates comprise polyphosphates) and/or corresponding acids and/or salts or red phosphorus, and particularly preferably selected from: urea phosphates or ammonium phosphates (it being possible for the said ammonium to derive from amines) and/or ammonium polyphosphates, and more preferably from: ammonium polyphosphates and more preferably still from ammonium polyphosphates having a number n of units of at least 1000, commonly otherwise known as phase II ammonium polyphosphates, g) optionally at least one metal oxide, such as $TiO_2$, preferably in the form of a concentrated paste, and more particularly at a level of metal oxide ranging up to 25 and preferably up to 6 parts by weight (of metal oxide), more preferably from 2 to 25 parts by weight and more preferably still from 2 to 6 parts by weight, h) optionally other additives and fillers, i) optionally reinforcements based on natural or synthetic fibres and corresponding fabrics, preferably reinforcements from: fibres, filaments, mats and fabrics of glass or fibres of carbon or of polyamide, in the latter case preferably an aromatic polyamide, such as Kevlar®, and with, the said polyester a1) being based on an acid component composed of at least 60 mol % of maleic acid and/or anhydride and on a polyol component composed of at least 70 mol % of propylene glycol (PG), with the possible remainder being selected from dipropylene glycol (DPG) and/or ethylene glycol (EG) and/or diethylene glycol (DEG) and/or neopentyl glycol (NPG) and/or 2-methylpropanediol (2-MPD) and/or butanediols (BDs) and/or pentanediols (PDs) and/or hexanediols (HDs), the said diols including, in the final three cases of diols, their methyl and/or ethyl substituted derivatives.

The resin a) can be based on a1) unsaturated polyester resin or based on a2) vinyl ester resin as defined above or based on a mixture of the two (a1)+a2)). The said unsaturated polyester a1) can be a mixture of at least two unsaturated polyester resins as described above. Likewise, the said vinyl ester a2) can be a mixture of at least two vinyl ester resins. Preferably, in the case of a mixture of vinyl esters, this mixture comprises at least one vinyl ester based on phenol/formaldehyde epoxide resins of epoxy-novolac type and more preferably the said phenol/formaldehyde vinyl esters constitute at least 50% by weight of this mixture of vinyl esters. It should be specified that both terms which can be employed, "unsaturated polyester resin" or "unsaturated polyester", mean the same thing unless more particularly specified. The same point is valid for the terms "vinyl ester resin" and "vinyl ester". In both cases, the weight of the said resin a) taken into account is the dry matter (resin) without diluent. Preferably, the resin a) is either exclusively based on unsaturated polyester a1) as defined above (including mixture of unsaturated polyesters) or based on a phenol/formaldehyde vinyl ester a2) or based on a mixture of a1) and a2) (mixture=a1)+a2)), as are defined above (a2)=vinyl ester), with a level of unsaturated polyester a1) of more than 50% by weight and preferably of at least 70% by weight, with respect to the weight of the said mixture of a1)+a2). In the case where the said vinyl ester a2) is a phenol/formaldehyde vinyl ester, the said mixture a1)+a2) can be prepared in any proportion between a1) and a2).

The unsaturated polyester resin and/or the vinyl ester resin are well known to a person skilled in the art in the field of composites or gel coats.

An unsaturated polyester is generally obtained by a polycondensation (esterification) reaction between an acid component comprising at least one polycarboxylic acid and/or anhydride (polyacid) comprising ethylenic unsaturation, such as maleic acid and/or anhydride, in the optional presence of a saturated polyacid/anhydride, and a polyol component, such as propylene glycol (PG).

A vinyl ester is an epoxy acrylate oligomer resulting from the esterification by (meth)acrylic acid of a polyepoxidized oligomer, for example an oligomer diepoxidized at the chain end, such as bisphenol A diglycidyl ether (BADGE), or a multiepoxidized oligomer (functionality of more than 2), such as epoxidized phenol/formaldehyde resins and more particularly epoxy-novolac resins.

Preferably, the said vinyl ester a2) is selected so that there was at least one vinyl ester derived from an epoxidized phenol/formaldehyde structure, more preferably with a functionality of greater than 2 and more preferably still of at least 3 and more particularly still of at least 7, and more particularly still from an epoxy-novolac resin. These phenol/formaldehyde epoxide resins which are precursors of vinyl esters in question are preferably linear in structure and are obtained by a condensation reaction between epichlorohydrin and phenol/formaldehyde condensates. The said vinyl esters preferably have acid numbers of less than 20.

According to a particularly preferred form, the said reactive diluent component b) comprises:

b1) a monomer comprising:
   b1a) at least one aromatic vinyl or allyl monomer chosen from: styrene and/or vinyltoluenes and/or tert-butylstyrene and/or divinylbenzenes or divinyltoluenes, for the aromatic vinyls, and/or from diallyl phthalates, for the aromatic allyls, and optionally
   b1b) at least one monofunctional (meth)acrylic monomer, preferably chosen from methacrylic monomers, such as methyl methacrylate (MMA) and hydroxyethyl methacrylate (HEMA),
   and optionally
b2) at least one polyfunctional (meth)acrylic monomer comprising at least 2, preferably from 2 to 4 and more preferably 2 or 3 (meth)acrylic functional groups, and more preferably still with the said diluent monomer b) comprising at least one monomer b1) and at least one monomer b2) as defined above. More particularly and preferably, the level by weight of the polyfunctional (meth)acrylic monomer b2) is from 2 to 60%, preferably from 2 to 40% and more preferably still from 5 to 30% of the total weight of the diluent component b).

The most preferred among the said monomers b1a) are styrene and/or vinyltoluenes and the most preferred among the said (meth)acrylic monomers b1b) are methacrylic monomers, such as methyl methacrylate (MMA) and/or hydroxyethyl methacrylate (HEMA). The said component b) takes into account a first portion of reactive diluent present with the dilute starting resin, as commercial unsaturated polyester or vinyl ester resin products are diluted and usually comprise at the start a level of 25 to 45% by weight of reactive diluent, such as styrene. The said diluent monomer b) also includes the diluent monomer of an optional additive in this composition, such as, for example, rheological additives of Bentonite type (for example Claytone®) in dispersion in styrene.

A second portion of reactive diluent b) is optionally necessary to adjust the final level of reactive diluent b) in the final thermosetting composition or final application formulation, according to the needs of the targeted application (adjustment of viscosity).

Mention may be made, among monomers b2) which can be used for the invention, of the following: 1,4-butanediol di(meth)acrylate (BDD(M)A), 1,3-butane glycol di(meth)acrylate (BGD(M)A), trimethylolpropane tri(meth)acrylate (TMPT(M)A), ethylene glycol di(meth)acrylate (EGD(M)A), diethylene glycol di(meth)acrylate (DEGD(M)A), hexamethylene glycol di(meth)acrylate (HMD(M)A), pentaerythritol tetra(meth)acrylate (PETT(M)A) or neopentyl glycol di(meth)acrylate (NPGD(M)A). The preferred monomers b2) are methacrylic monomers. The most preferred monomer b2) is BDD(M)A and more preferably still BDDMA.

The expansion agent c) preferably decomposes within a temperature range extending from 130 to 350° C., more particularly from 200 to 320° C. The said melamine derivatives can be compounds such as melam, melem, melon, melamine cyanurate, melamine phosphate or melamine borate. Melam, melem and melon are fused cyclic derivatives of melamine (with removal of ammonia), which derivatives are well known to a person skilled in the art. Melam corresponds to the fusion of two melamine molecules with elimination of ammonia, melem is a fused structure comprising 3 rings derived from melam by elimination of ammonia, and melon is in the polyfused form of polyamine polymer derived from melam. The preferred component c) is melamine and its derivatives, such as melam, melem and melon, and the even more preferred component c) is melamine, with a decomposition temperature (for melamine) of approximately 300° C.

The components c), d), e), a and g) are preferably added in the powder form to the composition formed of resin a) diluted with (comprising) the diluent b) and with the said component h) being able to be liquid or solid in the case of some additives, the fillers being solids. The level of diluent b) can be adjusted within the range indicated above in order to adjust the final viscosity of the formulation according to the final application and the processing method.

In the case of the application for laminates and other applications, except for pultrusion applications and compounds (such as BMC), the viscosity of the said thermosetting composition is adjusted, if necessary, in order to have an operating viscosity of less than 1500 mPa·s, preferably of less than 1000 mPa·s and more preferably of less than 500 mPa·s, the said viscosity being measured at 23° C. and under a shear gradient of 1000 s$^{-1}$. In the case of pultrusion, this viscosity preferably remains below 2500 mPa·s.

The component d) is optional and can be present at a content ranging from 0 to 250 parts and preferably from 0 to 175 parts by weight per 100 parts by weight of the said resin a).

The component e) is an agent which is a precursor of charring commonly known as "char source" and its function is to promote the formation of a protective charred film which, by the previous expansion caused by the thermal decomposition of the agent c), thus becomes a screen (charred expanded shell) which is thermally insulating (heat shield) and protects the material from exposure to the fire.

The presence of the component g) and/or optionally of the component d) has a tendency to improve the consistency of the protective heat shield formed after exposure to the fire. In this case, the component d) is present at a level ranging up to 250 and preferably up to 175 parts by weight per 100 parts of resin a).

According to the application, the other additives h) can be rheology additives, such as pyrogenic silica or clays/bentonites, for example Claytone® products, or low shrink or LP (low profile) additives or dispersing additives (surfactants) or wetting agents or mould-release agents, pigments, colouring pastes or inorganic fillers, such as calcium carbonate or talc (dihydroxylated magnesium silicate) or boehmite (aluminium oxide hydroxide: AlO(OH)).

These other additives h) can be adjusted as a function of the final application and as a function of the processing method used and are well known to a person skilled in the art in the field of thermosetting compositions.

The said unsaturated polyester is obtained by methods known to a person skilled in the art, by a polycondensation reaction between a dicarboxylic acid and/or anhydride component comprising an ethylenically unsaturated diacid or anhydride, such as maleic acid/anhydride (including fumaric acid form) and/or itaconic acid/anhydride, preferably maleic acid/anhydride, and a polyol component. Preferably, the said unsaturated polyester is based on an acid component composed of 60 to 100 mol % and preferably of 100 mol % of maleic acid and/or anhydride, the remainder with respect to 100% (that is to say, from 0 to 40% and preferably 0%) preferably being orthophthalic and/or isophthalic acid or anhydride. The level of ethylenically unsaturated acid/anhydride in the acid component controls the degree of unsaturation and the reactivity of the said polyester. The said unsaturated polyester can also be an unsaturated polyester modified with dicyclopentadiene (DCPD). The polyol component of the said polyester a1) is preferably composed of 70 to 100 mol % of propylene glycol (PG) and more preferably of 100 mol % of PG, with the possible remainder being at most 30 mol % and preferably 0 mol % of this polyol component, with the said possible remaining polyols being selected as specified above. According to a more specific form of the present invention, the said polyester a1) is based on a diacid component composed of 60 to 100 mol % of maleic acid/anhydride and based on a polyol component composed of 70 to 100 mol % of PG. More preferably still, the unsaturated polyester resin a1) is a resin with an acid component which is 100 mol % maleic and with a polyol component which is 100% PG.

The unsaturated polyester resins a1) having at least 60 mol %, preferably from 60 to 100 mol % and more preferably 100 mol % of maleic acid/anhydride in the acid component and at least 70 mol %, preferably from 70 to 100 mol % and more preferably 100 mol % of PG in the polyol component are more particularly suitable for formulations having a fire-retardant behaviour meeting the M1F1 criteria according to NF EN ISO 16-101.

The viscosity of the thermosetting composition according to the invention depends on the final application and on the processing method used. The thermosetting compositions for laminates have a viscosity of less than 1500 mPa·s and preferably of less than 1000 mPa·s and more preferably of less than 500 mPa·s at 23° C. for a shear gradient of 1000 s$^{-1}$.

The compositions according to the present invention have the following advantages in comparison with the known compositions of the state of the art:
 fluid compositions which are easy to process by the known processing methods mentioned above, without halogens, without toxic (CMR) compounds, and compositions meeting at least the HL2 criterion and preferably HL2 and HL3 criteria according to the R1 requirement of Standard prCEN/TS 45545-2:2008,
 simultaneously fire resistance as indicated, in combination with maintenance of the mechanical strength of the material and with the smoke given off having a reduced opacity and reduced toxicity.

More particularly, the said compositions are stable in terms of change in the viscosity with storage time, with an increase on storage for 2 months not exceeding 15% with respect to the initial viscosity of the composition (formulation).

A second subject-matter of the present invention is a thermosetting composition used for the preparation (precursor) of a thermosetting composition according to the invention as defined above, which (precursor) composition comprises or is composed of the components a) and b) as defined above. More particularly, this (precursor) composition is composed of the resin a) and of the monomers b) as defined above, that is to say, without the other components.

The present invention also relates to a process for the preparation of the thermosetting composition according to the invention, which process comprises the stage of mixing a precursor composition as defined as the second subject-matter of the present invention with the said components c), d) (d), if present), e), f), g) (g), if present) and h) (h), if present) as defined above and optionally comprises a final stage of addition of the said reinforcements i).

The present invention also relates to a moulding composition for composite components or to an application composition for laminates or to a structural adhesive or mastic or polyester concrete or casting compound or gel coat or top coat composition, which composition comprises at least one thermosetting composition as defined above according to the invention. Such a composition can be a composite moulding composition from: BMC (Bulk Moulding Compounds), AMC (Advanced Moulding Compound) or CIC (Continuous Impregnating Compound), which are well known by a person skilled in the art who has a thorough knowledge of moulding compositions for composites. These compositions comprise, as reinforcements i), natural fibres, such as hemp and/or flax fibres, and/or synthetic fibres and/or corresponding fabrics and in particular glass or carbon or polyamide fibres, in particular aromatic polyamide fibres, and the corresponding fabrics.

According to another possibility, the said composition can be a composition for application by the pultrusion route for composite components, for example for profiled elements for electrical rods, or by the spraying route (gun) or by contact (roller) for laminates, for example for cowling components or for industrial panels and components, or by the infusion route for industrial components or by the centrifugal route for pipes and pipelines or by the injection/compression moulding route (RTM: Resin Transfer Moulding) for transportation components (such as cabs) or by the filament winding route for silos and containers or by the casting route for polyester concrete or by the continuous impregnation route for corrugated sheets. According to another possibility, the composition can be a structural adhesive composition for the assembling of composite components or a gel coat or top coat composition, which may or may not be pigmented.

The uses particularly targeted for the thermosetting compositions as defined according to the present invention relate to the manufacture and use of moulded composite components or other composite components, such as laminated composite components, or of structural adhesives or mastics or gel coats or top coats or other coatings, or of industrial components, in the field of fire resistance. More particularly, the materials which result from this use of thermosetting compositions are fire resistant and/or intumescent.

A preferred use relates to applications in the field of transportation, more particularly in the field of motor vehicle transportation, rail transportation (more particularly urban transportation, by train or underground), sea transportation and air transportation, in the field of the building industry, in the field of civil engineering and public works, such as bridges and tunnels, or in the field of leisure and street furniture, such as leisure parks.

More particularly, the use of the thermosetting composition as defined according to the present invention relates to the manufacture and use of: moulded or laminated composite components, of structural adhesives or mastics or gel coats or top coats which result therefrom, for rail transportation. These finished components and products more particularly meet at least the HL2 criterion and preferably HL2 and HL3 criteria according to the R1 requirement of Standard prCEN/TS 45545-2:2008.

More particularly, the thermosetting compositions according to the invention are used in the manufacture of structural panels or in the manufacture of other composite components for public transportation means, such as rail transportation (train, including high speed train, regional express network, underground), sea transportation (boats) or road transportation (lorries, cars).

Mention may be made, as other possible applications, of:
 in the building industry: for coatings (renovation on an existing substrate, concrete or other) or installation of structural panels during construction,
 concrete application for the building industry or public works: either hooping of existing concretes (such as tunnels or bridges) or protection of existing parts (such as pillars) or production of intumescent polymer concrete as replacement for hydraulic cement,
 application with integrated function, for example production of formworks made of intumescent laminate into which the conventional structural concrete will be poured, it being possible for this process to be applied in the field of structural pillars or in the field of concrete slabs, and the like.

Finally, the present invention relates to moulded composite components or other converted composite components, to coatings, to joints or to applications of structural adhesives or of mastics for composites and of gel coats applied to the said composite components or to other substrates, with the said components or the said coatings or gel coats or top coats or joints (or applications) resulting from the crosslinking of at least one thermosetting composition as defined according to the present invention and with these finished products having an intumescent nature.

More preferably, the said moulded or converted composite components, coatings or joints or applications of structural adhesives or of mastics or of gel coats or of top coats as defined according to the present invention have a fire-retardant nature meeting at least the HL2 criterion and more preferably the HL2 and HL3 criteria according to the R1 requirement of Standard prCEN/TS 45545-2:2008.

EXPERIMENTAL PART

A) Starting Materials Used: See Table 1 Below

TABLE 1

Starting materials used, references and origin

| Product reference | Supplier | Technical function | Chemical nature |
|---|---|---|---|
| Epovia ® Optimum KRF 1001 | Cray Valley | Vinyl ester resin | Vinyl ester based on bisphenol A: 41.5% styrene (% dry resin: 58.5%); viscosity: 4.5 dPa · s (25° C.), $I_4 < 8$ |
| Epovia ® Optimum KRF 1051 | Cray Valley | Vinyl ester resin | Vinyl ester based on epoxy-novolac: 30.0% styrene (% dry resin: 70.0%); viscosity: 4.5 dPa · s (25° C.), $I_4 < 15$ and with a functionality of 3.6 |
| Norsodyne ® S86407TB | Cray Valley | Unsaturated polyester resin (UPR) | UPR based on NPG and DPG maleate/isophthalate: 42.0% styrene (% dry resin: 58.0%); viscosity: 8.5 dPa · s (25° C.) |
| Enydyne ® C40 8161 CT | Cray Valley | Unsaturated polyester resin (UPR) | DCPD-modified UPR categorised as M2F1 according to NF EN ISO 16-101, used as support (substrate) resin for lamination |
| Norsodyne ® G 703 | Cray Valley | Unsaturated polyester resin (UPR) | UPR based on PG (100%) maleate (46 mol %)/isophthalate (54%): 44.5% styrene (% dry resin: 55.5%); viscosity: 3.2 dPa · s (25° C.) |
| Norsodyne ® Upex 081341 | Cray Valley | Unsaturated polyester resin (UPR) | UPR based on PG (100%) maleate (100%), $I_4 = 3$ and $I_{OH} = 67$, 35.9% styrene (64.1% dry resin), viscosity 5.7 dPa · s (25° C.) |
| HDK ® N20 | Wacker | Rheological agent according to h) | Pyrogenic silica |
| Claytone ® PS3* | Chimilab Essor | Rheological additive according to h) | Bentonite modified with quaternary ammonium salt |
| Styrene | Total Petro Chemical | Reactive diluent b1a) | Styrene (>99.7% pure) |
| Sartomer ®SR 214 (BDDMA) | Sartomer | Reactive diluent b2) | 1,4-Butanediol dimethacrylate (BDDMA) |
| MMA | Arkema | Reactive diluent b1b) | Methyl methacrylate |
| FR Cros ® 484 | Budenheim | Phosphorus derivative according to f) | Modified ammonium polyphosphate with 32.5% P and $D_{50}$ of 18 μm (n > 1000) |
| Triethyl phosphate | Innochem | Phosphorus derivative according to Example 36 of WO 97/31056 | Purity > 99.5% |
| Melamine | ECEM | Expansion agent according to c) | Melamine |
| Charmor ® PM 40 | Perstorp | Char source according to e) | Pentaerythritol (95-100%) Dipentaerythritol (0-5%) |
| Apyral ® 20 X | Nabaltec | Component d) | 99.7% Aluminium trihydrate (ATH), with a specific surface (BET) of 1.2 m²/g and a density of 2.4 g/cm³ and a $D_{90}$ (μm) of 80 |
| Durcal ® 2 | Omya | Fillers h) | Calcium carbonate 33-47% less than 2 μm |
| Talc (Westmin ® 8E) | Mondo Mineral | Fillers h) | Talc (dihydroxylated magnesium silicate) with 60% having a size of less than 2 μm |
| BYK ® - A555 | BYK Chemie | Air release additive according to h) | Polymer solution |
| BYK ® - W940 | BYK Chemie | Dispersant/wetting additive Antisedimentation | Polycarboxylic acid/polysiloxane copolymer $I_4$: 130-170: copolymer solution with a solids content of 55% |
| BYK ® - W980 | BYK Chemie | Dispersant/wetting additive according to h) | 80% solution of salt of unsaturated polyamine amides with acidic polyesters ($I_a = 40$, $I_{amine} = 30$) |
| Promoter D | Akzo Nobel | Promoter of peroxide decomposition | Diethyl acetoacetamide |
| Eumulgin ® SML 20 | Cognis | Surfactant according to h) | Polyoxyethylene sorbitan monolaurate |
| MHPT | Albermarle Corp. | Promoter of peroxide decomposition | Secondary amine N-(2-hydroxyethyl)-N-methyl-para-toluidine >95% (mw 165.24) |
| Trigonox ® 21S | Akzo Nobel | Peroxide initiator | tert-Butyl peroxy-2-ethylhexanoate |
| Trigonox ® C | Akzo Nobel | Peroxide initiator | tert-Butyl peroxybenzoate |
| Butanox ® LPT | Akzo Nobel | Peroxide initiator | Methyl ethyl ketone peroxide in diisobutyl phthalate/active oxygen: 8.4-8.6% |
| Butanox ®-M50 | Akzo Nobel | Peroxide initiator | Methyl ethyl ketone peroxide in dimethyl phthalate/Active oxygen: 8.8-9.0% |
| Accelerator ® NL-23 | Akzo Nobel | Accelerator of peroxide decomposition | Solution of cobalt 2-ethylhexanoate salt and of dimethylaniline in a white spirit |
| Accelerator NL -51 P (6% Co) | Akzo Nobel | Accelerator of peroxide decomposition | 6% solution of cobalt 2-ethylhexanoate salt in an aliphatic ester |
| Soligen ® stabilizer C | OMG Borchers | Accelerator of peroxide decomposition | 21% solution of cobalt organic salts in a paraffinic mineral oil |

TABLE 1-continued

Starting materials used, references and origin

| Product reference | Supplier | Technical function | Chemical nature |
|---|---|---|---|
| Moulex ® 352 A | Additek | Additive according to h) | Pultrusion mould-release agent |
| Zn Stearate 101-6 | Peter Greven | Internal mould release agent | Zinc stearate |
| Inhibitor NLC ® 10 | Akzo Nobel | Inhibitor | para-tert-Butylcatechol as a 10% solution in an ester |
| White paste CV No. 9557 | Cray Valley | White pigment paste | White colouring paste based on 50% titanium oxide in an unsaturated polyester resin |
| Mat 123 | Vetrotex | Glass fibre reinforcement according to i) | Glass mat comprising powder binder - Mat 450 g/m$^2$ |
| Roving P 192 | Vetrotex | Glass fibre reinforcement according to i) | Continuous yarn, 4800 tex/4.8 g/m |
| Roving RB 2043 | PPG | Glass fibre reinforcement according to i) | Textured continuous yarn, 5000 tex/5 g/m |

*Claytone ® PS3: mentioned under the simplified name "Claytone ®" in the following experimental part B) Tests for General Evaluation of the Performance 1) Initial Viscosity and Evolution The viscosity of the formulated resins was measured using an Anton Paar (model MCR 100) rheometer with a "concentric cylinders" geometry (model CC27 3539).

Approximately 20 g of resin are introduced up to the mark in the container of the measurement system. The cylinder (spindle) is subsequently inserted in the measurement bench. The temperature of the resin is adjusted to and maintained at 23° C.±0.1° C.

The temperature-stabilized sample is subjected to a shear gradient of 1000 s$^{-1}$ for 3 minutes. The result is recorded at the end of the 3 minutes.

2) M and F Classification According to NF EN ISO 16-101

2.1) M Classification (Radiation Test) According to the Tests with the Epiradiator Starting from the q Index According to NF P 92-501

The q index makes it possible to locate the material in the M classification, according to the classification table below, with M0 corresponding to the best classification.

| | Value | | | | |
|---|---|---|---|---|---|
| | q = 0, no effective flammability and GCV* < 2.5 MJ/kg | 0 < q < 2.5 | 2.5 ≤ q < 15 | 15 ≤ q < 50 | q ≥ 50 |
| Classification | M0 | M1 | M2 | M3 | M4 |

*GCV: Gross calorific value 2.2) The F Classification 2.2.1) Opacity Test with the Smoke Chamber According to NF X 10-702

The following are measured:

the maximum specific optical density $D_m$ after testing for 20 min the VOF4 value corresponds to the darkening caused by the smoke, measured in the first 4 minutes of the test (see B) 3.3.2)).

2.2.2) The Toxicity Test with a Tubular Furnace and Chromatography According to NF P 70-100

The CIT index is first determined (conventional index of toxicity).

Finally, the overall smoke index SI is calculated, with F0 corresponding to the best classification:

$$SI=(D_m/100)+(VOF4/30)+(CIT/2)$$

and this index SI makes possible the F classification according to the following table:

| | Value | | | | | |
|---|---|---|---|---|---|---|
| | SI ≤ 5 | 5 < SI ≤ 20 | 20 < SI ≤ 40 | 40 < SI ≤ 80 | 80 < SI ≤ 120 | SI > 120 |
| Classification | F0 | F1 | F2 | F3 | F4 | F5 |

Important comment: in the context of Standard prCEN/TS 45545-2:2008, all the toxicity tests take place in the smoke chamber and not in the tubular furnace. This is because the gases are analysed directly in the chamber by FTIR. The sample, in the horizontal position, is exposed to an irradiance of 50 kW/m$^2$. Furthermore, the NOx products (nitrogen oxide) are also taken into account in the calculation of the index CIT.

3) MARHE, CFE, CIT, VOF4 and Ds(4) According to prCEN/TS 45545-2:2008

3.1) Determination of the MARHE with a Cone Calorimeter According to ISO 5660-1

The MARHE is the maximum of the ARHE (Average Rate of Heat Emission) and can be defined as the maximum of the average rate of heat emission during the combustion. Mathematically, the ARHE corresponds to an integral of the curve of the rate of heat release. The smaller it is, the better the result.

3.2) Determination of the CFE with a Radiant Panel According to ISO 5658-2

The aim of this test is to evaluate the lateral spread of a flame. The parameter which is of interest to us is the CFE: critical flux at extinguishment in kW/m$^2$; this is the incident heat flux at the surface of the test specimen (flux at the point situated on the horizontal median axis) where the flame ceases to advance and may thus subsequently go out.

The distance of lateral spread of the flame is correlated with a heat flux determined beforehand every 5 cm during the calibration of the fluxes. Marks on the support make it possible to evaluate this distance. The higher the CFE, the better the result.

3.3) Determination of the Ds(4) and of the VOF4 by the Smoke Chamber in the Horizontal Position According to ISO 5659-2

3.3.1) Specific Optical Density at 4 Minutes Ds(4)

This is the measurement of the degree of opacity of the smoke, which is the negative decimal logarithm of the relative transmission T of the light at 4 minutes, multiplied by a factor calculated by dividing the volume V of the test chamber by the product of the exposed area A of the test specimen and the length L of the light beam:

$$Ds(4) = (\log_{10}(100/T) + F) \ast (V/A \ast L)$$

with T in % and with F a factor dependent on optical density of the filter.

3.3.2) VOF4

Cumulative value of the specific optical density in the first 4 minutes of the test:

$$VOF4 = D_s(1) + D_s(2) + D_s(3) + D_s(4)/2$$

3.4) CIT According to prCEN/TS 45545-2:2008, According to Annex C

The conventional index of toxicity (CIT) is calculated by Fourier transform infrared (FTIR) directly in the smoke chamber. This FTIR is used for the identification and the quantification of compounds composed of diatomic and polyatomic molecules with heteronuclear bonds.

A light beam is directed through the analytical cell and an interferogram is collected at a predefined moment which corresponds to x minutes from the start of the test, with x corresponding to 4 and to 8 minutes respectively, and subsequently the two corresponding interferograms are converted to absorption spectra and analysed.

The concentrations of gases present in the sample are calculated from the data of the specific absorption band of the compound, in comparison with the spectra corresponding to reference gas mixtures (standards).

The CIT is then calculated in the following way:

$$CIT = 0.0805 \ast \Sigma_i (c_i/C_i)$$

with i=1 to 8 for the 8 gases looked for/detected (see table below), $c_i$ being the concentration, measured in mg/m³, of the gas i and $C_i$ being the reference concentration of the same gas according to the reference table below:

|  | Gaseous components | | | | | | | |
|---|---|---|---|---|---|---|---|---|
|  | $CO_2$ | CO | HBr | HCl | HCN | HF | $NO_x$ | $SO_2$ |
| Reference concentration "$C_i$" mg/m³ | 72000 | 1380 | 99 | 75 | 55 | 25 | 38 | 262 |

In the case of the measurements of the tests presented, the CIT measurement selected was that carried out at 8 minutes, as representing the less favourable result among the 2 measurements carried out.

The higher this CIT parameter, the more the material burns and gives off smoke, with the risk of poisoning.

4) HL1, HL2 and HL3 Criteria According to the R1 Requirement of Standard prCEN/TS 45545-2:2008

| Method | Parameter measured (units) | HL1 | HL2 | HL3 |
|---|---|---|---|---|
| ISO 5658-2 | CFE (kW/m²) | ≥20 | ≥20 | ≥20 |
| ISO 5660-1 | MARHE (kW/m²) | ≥90 | >60 and ≤90 | ≤60 |
| EN ISO 5659-2 | Ds(4) | >300 and ≤600 | >150 and ≤300 | ≤150 |
| EN ISO 5659-2 | VOF4 (min) | >600 and ≤1200 | >300 and ≤600 | ≤300 |
| EN ISO 5659-2 | CIT | >0.9 and ≤1.2 | >0.75 and ≤0.9 | ≤0.75 |

5) LOI (Limiting Oxygen Index) Classification According to EN ISO 4589-2

According to the R27 requirement of Standard prCEN/TS 45545-2:2008: HL1 if 28, HL2 if ≥28 and HL3 if ≥32.

C) Preparation, Processing and Evaluation of the Performances: Thermosetting Compositions According to the Invention and Reference Compositions for Comparison 1) Compositions for Laminates 1.1) Preparation of the Formulations of Examples A, B, C, G, K and I 1.1.1) Preparation of the "Mother Paste" of Claytone® at 6% by Weight in Styrene 3.6 p of Claytone (Claytone® PS3) are dispersed in 56.4 p of styrene monomer and the Claytone (clay/bentonite treated with a quaternary ammonium salt) is subsequently exfoliated by vigorous (high shear) stirring using a deflocculating paddle with a diameter of 5 cm at 2000 rev/min for 15 minutes. The mixture obtained must be viscous and consistent.

Preparation of the Mixtures (Formulations)

The following constituents are added, in a preestablished order and with constant stirring (deflocculating paddle with a diameter of 5 cm at 800 rev/min), to the mother paste prepared in C)1.1.1):

|  | Component | | | | | |
|---|---|---|---|---|---|---|
|  | Upex 081341 | BDDMA | BYK® 980 | MHPT | NLC® 10 | White paste CV No. 9557 | Styrene |
| Amount (p) | 290* | 50 | 7 | 2 | 1 | 15 | 55 |

*Including 186 p of dry resin a) and 104 p of styrene

The inorganic and organic fillers are introduced in a second step and still with stirring according to the following table:

| | Component | | | |
|---|---|---|---|---|
| | Apyral ® 20X* | Charmor ® PM40 | Melamine | FR Cros ® 484 |
| Amount (p) | 195 | 50 | 100 | 195 |

*195 p Apyral ® 20X or calcium carbonate or magnesium silicate (talc) depending on the tests After stirring for 10 minutes, the homogeneous and fluid mixture is off-white in colour.

1.2) Processing and Crosslinking, Annealing (Conditions)

2 p of accelerator (6% Co; NL 51 P from Akzo) are added to the composition (formulation) prepared in part C)1.1) and sufficient mixing is carried out in order to obtain a homogeneous dispersion of this accelerator, before the addition of 15 p of peroxide (MEKP; Butanox® M50 from Akzo), again followed by homogeneous mixing of the paste in order to obtain an equally homogeneous dispersion of this peroxide, in order to initiate the radical crosslinking of the formulation.

Under these conditions, the gel time (100 g pot life) of the resin at 23° C. is 20±5 minutes. This implementation was used for the compositions comprising an unsaturated polyester or a mixture of unsaturated polyester with a vinyl ester (50/50). In the specific case of compositions based on vinyl esters, the said accelerator is replaced with 5 p of NL 23 from Akzo and the said peroxide with the same amount of the peroxide Butanox LPT from Akzo.

1.3) Preparation and Conditioning of the Test Specimens Tested

The test specimens tested according to prCEN/TS 45545-2:2008 result from the impregnation of three Mat 123 samples (comprising a powder binder) by the formulation prepared according to part C)1.2). The final laminated composite comprises 20%±3% of glass (Mat 123).

1.3.1) Preparation of the Laminates

The appropriate amount of resin (prepared in C)1.2)) is deposited on a terephthalate polyester (Mylar®) film and is spread over an area of approximately 40×40 cm. A Mat 123 cut out beforehand with dimensions of 40×40 cm is subsequently deposited on the bed of resin. The impregnation and the elimination of the trapped air bubbles are facilitated by the use of an "air-releasing" roller well known in the profession of lamination.

This operation is carried out again in the same way for the following 2 Mats.

The amount of resin is adjusted in order to thoroughly wet the fibred reinforcement.

1.3.2) Preparation of the Test Specimens
prCEN/TS 45545-2:2008

| | |
|---|---|
| ISO 5660-1 (MARHE) | 5 test specimens of 10 × 10 cm × thickness |
| ISO 5658-2 (CFE) | 3 test specimens of 80 × 15.5 cm × thickness |
| ISO 5659 -2 (CIT/VOF4/Ds(4)) | 5 test specimens of 7.6 × 7.6 cm × thickness |
| NF EN ISO 16-101 | |
| NF P 92-501 (M classification) | 5 test specimens of 40 × 30 cm × thickness |
| NF X 10-702 (opacity) | 5 test specimens of 7.6 × 7.6 cm |
| NF P 70-100 (toxicity) | 2 × 1 g |

1.3.3) Annealing of the Test Specimens 24 hours at ambient temperature, followed by 4 h at 120° C. in a ventilated oven.

1.4) Compositions (Formulations) Prepared and Results
1.4.1) Examples A, B, C, G, K and I
1.4.1.1) Preparation of the Formulations Six formulations were prepared for a total weight of 1020 parts according to Examples A, B, C, G, K and I, comprising the following components in identical (constant) amounts:

| | Component | | | | | | | |
|---|---|---|---|---|---|---|---|---|
| | Upex 081341 | BDDMA | Adjusting styrene | Claytone ®** | BYK ® W980 | MHPT | NLC ® 10 | White paste CV 9557 |
| Amount (p) | 290* | 50 | 55 | 60** | 7 | 2 | 1 | 15 |

*Including 186 p of dry resin and 104 p of styrene
**Including 56.4 p of styrene and 3.6 p of Claytone ®

These combined constituents represent 480 p. The components in variable amounts for example Example A, B, C, G, K and I appear in Table 2 below (for 290 p of Upex 081341 resin).

TABLE 2

Additional components with variable amounts for formulations of Examples A, B, C, G, K and I

|  | Examples | | | | | |
|---|---|---|---|---|---|---|
|  | A (invention) | B (invention) | C (invention) | G (invention) | K (invention) | I (comparative) |
| Mixture according to C1.4.1) | 480 | 480 | 480 | 480 | 480 | 480 |
| FR Cros ® 484 | 195 | 195 | 195 | 135 | 305 | 0 |
| Charmor ® PM 40 | 50 | 50 | 50 | 35 | 78 | 0 |
| Apyral ® 20X ATH | 195 | 0 | 0 | 300 | 0 | 540 |
| Talc | 0 | 195 | 0 |  | 0 | 0 |
| Calcium carbonate | 0 | 0 | 195 |  | 0 | 0 |
| Melamine | 100 | 100 | 100 | 70 | 157 | 0 |

1.4.1.2) Measurement of the Performances

According to ISO 5660-1 on laminates prepared according to the description in C)1.3.1) to C)1.3.3).

|  | Examples | | | | | |
|---|---|---|---|---|---|---|
|  | A (invention) | B (invention) | C (invention) | G (invention) | K (invention) | I (comparative) |
| Viscosity* at 1000 s$^{-1}$ (dPa · s) | 3.15 | 8.2 | 3.45 | 2.7 | 4.6 | 1.95 |
| Performances |  |  |  |  |  |  |
| MARHE (kW/m$^2$) | 70-52-49 | 48-34 | 59-44 | 79.5-83 | 25-33 | 102 |
| Mean MARHE (kW/m$^2$) | 57 | 41 | 51 | 81 | 29 | 102 |
| Classification according to prCEN/TS 45545-2:2008 according to the MARHE criterion | HL3 | HL3 | HL3 | HL2 | HL3 | HL1 |

*Measurement using concentric cylinder rheometer according to procedure described in B1

1.4.2) Examples D, E and F (see Table 3)

1.4.2.1) Preparation of the Formulations

Three formulations were prepared for a total weight of 1000 parts comprising the following components in identical (constant) amounts:

|  | Component | | | | | | | | | |
|---|---|---|---|---|---|---|---|---|---|---|
|  | Upex 081341 | Claytone ® 6% in styrene | BYK ® W980 | MHPT | NLC ® 10 | White paste CV 9557 | Apyral ® 20X | FR Cros ® 484 | Charmor ® PM40 | Melamine |
| Amount (p) | 290* | 60** | 7 | 2 | 1 | 15 | 195 | 195 | 50 | 100 |

*Including 186 p of dry resin and 104 p of styrene
**Including 56.4 p of styrene and 3.6 p of Claytone ®

These combined constituents represent 915 p.

The components in variable amounts for each Example (D), (E) and (F) appear in Table 3 below.

TABLE 3

Additional components with variable amounts
for formulations of Examples (D), (E) and (F)

| Examples | D (invention) | E (invention) | F (invention) |
|---|---|---|---|
| Mixture according to 1.4.2) | 915 | 915 | 915 |
| BDDMA | 0 | 30 | 50 |
| Diluting styrene (adjustment) | 85 | 55 | 35 |

1.4.2.2) Measurement of the Performances (ISO 5660-1)

According to ISO 5660-1 on laminates prepared according to the description in C)1.3.1) to C)1.3.3)

| | Examples | | |
|---|---|---|---|
| Performances | D (invention) | E (invention) | F (invention) |
| Mean MARHE kW/m$^2$ | 89 | 77 | 63 |
| prCEN/TS 45545-2: 2008 classification according to MARHE | HL2 | HL2 | HL2 |

1.4.3) Examples M (without Glass Reinforcement) and N (with Glass Reinforcement)

1.4.3.1) Preparation of the Formulations

Two formulations were prepared for a total weight of 1035 parts by weight according to Examples M and N comprising the following components in identical (constant) amounts:

| | | | | | Component | | | | | | |
|---|---|---|---|---|---|---|---|---|---|---|---|
| Upex 081341 | BDDMA | Adjusting Styrene | Claytone ® 6% in styrene | Charmor ® PM40 | FR Cros ® 484 | Apyral ® 20X ATH | Melamine | BYK ® W980 | MHPT | NLC ® 10 | Paste CV 9557 |
| Amount | 290* | 50 | 70 | 60** | 50 | 195 | 195 | 100 | 7 | 2 | 1 | 15 |

*Including 186 p of dry resin and 104 p of styrene
**Including 56.4 p of styrene and 3.6 p of Claytone ®

1.4.3.2) Preparation without Glass Fibre (M) and with Glass Fibres (N)

a) Preparation of M

The formulation described in C)1.4.3.1) and prepared according to part C)1.2) is poured between 2 glass plates of 35×30 cm waxed and polished beforehand, the separation of 4 mm of which is provided by metal ties and the leaktightness of which is provided by elastomeric seals.

The component is released from the glass plates after crosslinking at ambient temperature for 24 h. An annealing is carried out according to the procedure in C)1.3.3). Subsequently, 3 test specimens of 15×1×0.4 cm are cut out from the cast plaque in order to be evaluated for LOI according to EN ISO 4589-2.

b) Preparation of N

This is the same procedure as M, for the moulding and preparation of test samples, except that the formulation comprises glass fibres, with a preparation of the formulation carried out according to the description in parts C)1.3.1) to C)1.3.3).

1.4.3.3) Measurement of the Performances 1.4.3.3.1) Change in the Viscosity of the Mixture (or Composition) M on Storage The test is carried out by withdrawing the sample of 20 g, of an amount of composition M of 20 kg, stored in a 25 kg metal container, in a chamber climate-controlled at 23±1° C. Measurement of the viscosity: already described in part B.1).

Results: see Table 4 below.

TABLE 4

Change in the viscosity for composition M on storage

| Duration of storage (days) | Viscosity (dPa · s) at 23 ± 1° C./1000 s$^{-1}$ | % Variation (vs starting viscosity) |
|---|---|---|
| 0 | 2.6 | 0 |
| 26 | 2.8 | 7.8 |
| 71 | 2.9 | 11.5 |

1.4.3.3.2) Measurement of the LOI (Limiting Oxygen Index) According to EN ISO 4589-2 for M and N Fire-retardant performances in terms of Limiting Oxygen Index (LOI) as % of oxygen:

M: 65-66% and N: 61-62%

According to the R27 requirement of Standard prCEN/TS 45545-2:2008, the LOI must be greater than or equal to 32 for the HL3 level. This is the case for the two tests M and N examined.

1.4.4) Comparison with Respect to the State of the Art (WO 97/31056): See Table 5

1.4.4.1) Formulation Prepared (O)

Preparation according to the procedure described in C)1.1.3 to C)1.3).

TABLE 5

Comparison vs state of the art

| | Ref. Example No. 36 according to WO 97/31056 | Example O according to the invention |
|---|---|---|
| Reference UP resin | Upex 081341 | Upex 081341 |
| Amount of diluted resin | 340* | 290** |
| BDDMA | 0 | 50 |
| Adjusting styrene | 100 | 70 |
| 6% Claytone ® | 0 | 60*** |
| FR Cros 484 | 0 | 195 |
| Charmor ® PM 40 | 0 | 50 |
| Apyral ® 20X ATH | 0 | 195 |
| Triethyl phosphate | 50 | 0 |
| Melamine | 200 | 100 |
| Calcium carbonate | 400 | 0 |
| BYK ® W 980 | 7 | 7 |
| MHPT | 2 | 2 |
| NLC ®-10 | 0 | 1 |

TABLE 5-continued

Comparison vs state of the art

| | Ref. Example No. 36 according to WO 97/31056 | Example O according to the invention |
|---|---|---|
| White colouring paste CV No. 9557 | 0 | 15 |
| Total excluding the initiation system | 1099 | 1035 |
| NL51-P | 2 | 2 |
| MEKP Lamination | 15 | 15 |
| % glass (3 Mats 123) | Approximately 20% | Approximately 20% |

*Including 218 p of dry resin a) and 122 p of styrene
**Including 186 p of dry resin a) and 104 p of styrene
***Including 56.4 p of styrene and 3.6 p of Claytone ®

1.4.4.2) Measurement of the Performances: See Table Below

| | Ref. Example No. 36 according to WO 97/31056 | Example O according to the invention |
|---|---|---|
| MARHE (kW/m$^2$) | 142 | 59 |
| prCEN/TS 45545-2: 2008 classification according to MARHE | HL1 | HL3 |

1.4.5) Example J in Pultrusion
  1.4.5.1) Preparation of the formulation

A formulation was prepared comprising the following components in the following amounts:

| | BDDMA | Claytone ® 6% | Byk ® W980 | NLC ® 10 | Paste CV 9557 | FR Cros ® 484 | Charmor ® PM40 |
|---|---|---|---|---|---|---|---|
| Amount (p) | 50 | 60* | 7 | 1 | 15 | 195 | 50 |

| | Apyral ® 20X ATH | Melamine | Moulex ® 352A | Zn stearate | Trigonox ® 21S | Trigonox ® C |
|---|---|---|---|---|---|---|
| Amount (p) | 195 | 100 | 7 | 10 | 2 | 10 |

*Including 56.4 p of styrene and 3.6 p of Claytone ®

These combined constituents represent 702 p.

The additional components and corresponding amounts appear in Table 6 below for formulation J.

TABLE 6

Components of the formulation J

| Reference | J (invention) |
|---|---|
| Mixture according to C 1.4.5.1) | 702* |
| Upex 081341 resin (diluted) | 290** |
| Adjusting styrene | 70 |
| Total diluent b) | 280.4 |
| MHPT | 2 |
| Total weight of the composition | 1064 |

*Including 50 p of BDDMA and 56.4 p of styrene from the solution of Claytone ®
**Including 186 p of dry resin a) and 104 p of styrene 1.4.5.2) Preparation of the Pultruded Products The formulation J prepared according to C)1.4.5.1) is ready for use and it is not necessary to add accelerator (6% cobalt type).

The peroxides Trigonox 21S and Trigonox C present in the mixture trigger the crosslinking process for a temperature at least greater than 60° C. by passing through a heated die.

According to a continuous process, the 16 strand Roving P192 and 12 strand Roving C 1698 glass fibres pass into a vat containing the resin in order to be impregnated therein. The combined product subsequently passes into a mould heated to 140° C. through a die with dimensions of 5 cm×0.5 cm. The resin crosslinks and cures during its passage through the mould. The flat profiled element exits continuously from the mould at the rate of 0.5 m/s. The degree of crosslinking is greater than 95% at this stage.

1.4.5.3) Measurement of the LOI (Limiting Oxygen Index) According to EN ISO 4589-2

Fire-retardant performances in terms of Limiting Oxygen Index (LOI) as % of oxygen:

| Ref. | J |
|---|---|
| Limiting Oxygen Index (LOI) as % of O$_2$ (vol) | 52-53 |

According to the requirement of Standard prCEN/TS 45545-2:2008, the LOI must be equal to or greater than 32 for HL3.

1.4.6) Formulation of Example O with Mould Side Face (Glossy) and Air Side Face (Mat)

1.4.6.1) Preparation of the Formulations

The formulation O already described in C)1.4.4) is prepared according to the procedure of C)1.1) to C)1.3) and has formed the subject of a complete evaluation according to prCEN/TS 45545-2:2008 and NF EN ISO 16-101.

1.4.6.2) Measurement of the prCEN/TS 45545-2:2008 and NF EN ISO 16-101 Performances

TABLE 7

Performances of the formulation O

| Example O (invention) | | R1 requirement | Mould side face | Air side face |
|---|---|---|---|---|
| EN 45545 performances | | | | |
| ISO 5660-1 prCEN/TS 45545-2: 2008 | MAHRE (kW/m$^2$) | HL2 60 < MAHRE < 90 HL3 MAHRE < 60 | 62.0 (HL2) | 59.9 (HL3) |
| ISO 5658-2 | CFE (kW/m$^2$) | Mini 20 | 22.7 (HL3) | 28.3 (HL3) |
| EN ISO 5659-2 | Ds(4) | HL2 Maxi 300 HL3 Maxi 150 | 115 (HL3) | 85 (HL3) |
| EN ISO 5659-2 | VOF4 | HL2 Maxi 600 HL3 Maxi 300 | 178 (HL3) | 175 (HL3) |
| EN ISO 5659-2 prCEN/TS 45545-2: 2008 | CIT at 4 min | HL2 Maxi 0.9 HL3 Maxi 0.75 | 0.09 (HL3) | 0.09 (HL3) |
| EN ISO 5659-2 prCEN/TS 45545-2: 2008 | CIT at 8 min | HL2 Maxi 0.9 HL3 Maxi 0.75 | 0.31 (HL3) | 0.35 (HL3) |
| NF EN ISO 16-101 performances | | | | |
| NF P 92-501 | M classification | M1 0 < q < 2.5 | q = 0.9 (M1) | q = 1.0 (M1) |
| NF X 10-702/NF X 10-700 | F classification | F1 5 < SI < 20 | SI = 11 (F1) | SI = 13 (F1) |

2) Intumescent Gel Coat Compositions 2.1) Preparation of the Intumescent Gel Coat The following constitutents are added, in a preestablished order and with constant stirring (deflocculating paddle with a diameter of 5 cm at 1200 rev/min), to the Upex 081341 resin: BYK® W 980, BYK® A 555, NL 51-P, Soligen® stabilizer C, Promoter D, inhibitors, Eumulgin® SML20.

The inorganic and organic fillers and the adjusting styrene are introduced in the second stage, still with stirring, in the following order: HDK® N20, Charmor® PM 40, melamine, FR Cros® 484, styrene, Apyral® 20X and optionally, if present, the white colouring paste CV No. 9557. After stirring for 10 minutes, a homogeneous and fluid mixture which is off-white in colour is obtained. The components at variable amounts of Examples P, Q and R appear in Table 8 below.

2.2) Processing and Crosslinking 18 p of peroxide MEKP (Butanox® M50 from Akzo) are added to the thoroughly homogenised gel coat prepared according to C)2.1) in order to initiate the radical crosslinking of the gel coat.

Under these conditions, the gel time (200 g pot life) of the gel coat at 25° C. is 10±3 minutes.

The gel coat is subsequently applied to a prewaxed glass mould using a spray gun and at a predetermined thickness of gel coat (see Tables 8 and 9 below).

2.3) Preparation and Conditioning of the Test Specimens Tested

Lamination is carried out one hour after the application of the gel coat described above. This is carried out with 3 mats comprising powder binder of 450 g/m$^2$ impregnated with Enydyne® C40-8161 CT and is accelerated with 0.15% by weight of NL 51P from Akzo (cobalt octoate solution comprising 1% of Co) and is catalysed with 1.2% by weight of Butanox® M50, with a fibre/resin ratio by weight of 20/80. The impregnation and the elimination of the trapped air bubbles are facilitated by the use of an "air-releasing" roller known in the profession of lamination.

After complete crosslinking, the test specimens thus produced are maintained at a temperature of between 20 and 25° C. for 24 hours before being afterbaked (annealed) at 120° C. for 4 hours and before being evaluated according to Standard prCEN/TS 45545-2:2008.

Tests carried out: see Table 8

P: Formulation without ATH, with 2 gel coat thicknesses: 600 and 2000 microns

Q: Formulation with ATH, with 2 gel coat thicknesses: 600 and 2000 microns

R: Formulation with ATH and without colouring pastes, with 1 gel coat thickness: 600 microns

TABLE 8

Gel coat compositions P, Q and R

| Ref. | P | Q | R |
|---|---|---|---|
| Diluted reference resin a) | Upex 081341 | Upex 081341 | Upex 081341 |
| Amount of diluted resin a) | 100* | 100* | 100* |
| Adjusting styrene | 40 | 40 | 13 |
| BDDMA | 0 | 0 | 0 |
| FR Cros ® 484 | 52 | 67 | 67 |
| Charmor ® PM 40 | 35 | 17 | 17 |
| Apyral ® 20X (ATH) | 0 | 67 | 67 |
| Melamine | 52 | 34 | 34 |
| BYK ® W 980 | 0 | 2.4 | 2.4 |
| BYK ® A 555 | 0.5 | 0.5 | 0.5 |
| HDK ® N20 | 2.2 | 2.2 | 2.2 |
| White colouring paste CV No. 9557 | 28.3 | 33.1 | 0 |
| NL 51-P | 0.6 | 0.6 | 0.6 |
| Soligen ® stabilizer C | 0.06 | 0.06 | 0.06 |
| Promoter D | 0.15 | 0.15 | 0.15 |
| Inhibitors | 0.22 | 0.22 | 0.22 |
| Eumulgine ® SML20 | 0.22 | 0.22 | 0.22 |
| TOTAL | 311.25 | 364.45 | 304.35 |
| Laminated substrate | C40-8161CT | C40-8161CT | C40-8161CT |
| Gel coat thickness μm | 600-2000 | 600-2000 | 600 |
| V5 (mPa·s)** | 10 760 | 5040 | 20 320 |
| V50 (mPa·s)** | 2396 | 1420 | 7028 |
| V5/50 | 4.49 | 3.55 | 2.89 |

*Including 64.1 p of dry resin a) and 35.9 p of styrene
**V5 and V50: Brookfield DV II viscosity at 5 and 50 revolutions/min at 25° C. with Spindle 4 for the gel coat compositions

TABLE 9

MARHE results as a function of the composition and of the thickness of the gel coats P, Q and R

| Test | Thickness (μm) | ATH | Colouring paste | MARHE (kW/m$^2$) | R1 classification prCEN/TS 45545-2: 2008 |
|---|---|---|---|---|---|
| P | 600 | No | Yes | 41.5 | HL3 |
| P | 2000 | No | Yes | 34.2 | HL3 |
| Q | 600 | Yes | Yes | 44.5 | HL3 |
| Q | 2000 | Yes | Yes | 38.1 | HL3 |
| R | 600 | Yes | No | 56.8 | HL3 |

3) Additional Tests with Compositions for Laminates 3.1) Preparation of the Exemplary Formulations T, U, V, W, X, Y and Z Having a Resin a) of Variable Nature and with a Constant Level of Resin a) (on a Dry Basis): See Compositions in Table 10

The preparation is carried out according to the procedure described in C)1.1) to C)1.3).

TABLE 10

Compositions T, U, V, W, X, Y, Z having a resin a) of variable nature

| References | T | U | V | W | X | Y | Z |
|---|---|---|---|---|---|---|---|
| Upex 081341 (diluted) | 290* | | | | | 145* | 145* |
| Norsodyne ® G 703 (diluted) | | 334* | | | | | |
| Norsodyne ® S 86407 TB (diluted) | | | 285* | | | | |
| Epovia ® Optimum KRF 1001 (diluted) | | | | 317* | | 158* | |
| Epovia ® Optimum KRF 1051 (diluted) | | | | | 265* | | 133* |
| Including total of dry resin a) | 186 | 186 | 186 | 186 | 186 | 186 | 186 |
| Including styrene of the resin | 104 | 148 | 99 | 131 | 79 | 117 | 92 |
| Adjusting styrene | 70 | 26 | 75 | 43 | 95 | 57 | 82 |
| Total styrene (of resin + adjusting + Claytone ®) | 230.4 | 230.4 | 230.4 | 230.4 | 230.4 | 230.4 | 230.4 |
| 6% Claytone ® | | | | 60** | | | |
| BDDMA | | | | 50 | | | |
| BYK ® 980 | | | | 7 | | | |
| BYK ® 940 | | | | 5 | | | |
| MHPT | | | | 2 | | | |
| White paste CV No. 9557 | | | | 15 | | | |
| Apyral ® 20X | | | | 195 | | | |
| Charmor ® PM 40 | | | | 50 | | | |
| Melamine | | | | 100 | | | |
| FR Cros ® 484 | | | | 195 | | | |
| Formulation total | 1039 | 1039 | 1039 | 1039 | 1039 | 1039 | 1039 |

*Amount of diluted resin for a total of 186 p of dry resin a) (for Y and Z: 50/50 mixtures of unsaturated polyester UP and of vinyl esters)
**Including 3.6 p of Claytone ® (Claytone ® PS3) and 56.4 p of styrene 3.2) Results of the Performances of the Laminates Based on the Formulations T, U, V, W, X and Z (According to ISO 5660-1): see Table 11

TABLE 11

Intumescence performance as a function of the nature of the resin a)

| Examples | T | U | V | W | X | Y | Z |
|---|---|---|---|---|---|---|---|
| Performances | | | | | | | |
| MARHE (kW/m$^2$) | 71.1-67.2 | 105.1-105.5 | 114.6-110.3 | 102.5-93.3 | 67.3-69.0 | 100.9-98.4 | 81.4-84.3 |
| MARHE mean | 69.1 | 105.3 | 112.5 | 97.9 | 68.2 | 99.6 | 82.9 |
| Classification according to MARHE criterion, according to prCEN/TS 45545-2:2008 | HL2 | HL1 | HL1 | HL1 | HL2 | HL1 | HL2 |

The invention claimed is:

1. Thermosetting composition, characterized in that it is devoid of any halogenated additive and of any halogenated structure in its components and comprises:
   a) per 100 parts by weight of a resin, which weight is expressed as weight of dry resin, comprising:
      a1) at least one unsaturated polyester, having an acid number of less than 10, or a combination of a1) with
      a2) at least one vinyl ester,
   b) 40 to 200 parts by weight of at least one reactive diluent selected from ethylenically unsaturated monomers copolymerizable with the said resin,
   c) 20 to 110 parts by weight of at least one agent for expansion by thermal decomposition, which agent is selected from the group consisting of: melamine and derivatives thereof, guanidine, glycine, urea, triisocyanurates and azodicarbonamide,
   d) 0 to 250 parts by weight of aluminium trihydrate,
   e) 10 to 80 parts by weight of at least one agent which is a precursor of charring selected from the group consisting of: sugars, starch, potato flour, pentaerythritol (PET) and derivatives of PET, erythritol and sorbitol,
   f) 50 to 200 parts of at least one compound selected from the group consisting of a phosphorus derivative selected from the group consisting of phosphonates, phosphates and polyphosphates and corresponding acids and salts thereof, and red phosphorus, and at least one boric acid derivative,
   g) optionally at least one metal oxide,
   h) optionally an additive, filler, or both,
   i) optionally reinforcements based on at least one of natural fibres, synthetic fibres, corresponding fabrics, and
   in that said polyester a1) is based on an acid component composed of at least 60 mol % of maleic acid and/or anhydride and on a polyol component composed of at least 70 mol % of propylene glycol, with a remainder being selected from the group consisting of dipropylene glycol, ethylene glycol, diethylene glycol, neopentyl glycol, 2-methylpropanediol, butanediols, pentanediols and hexanediols.

2. Thermosetting composition according to claim 1, characterized in that it has a viscosity of less than 1500 mPa·s, which viscosity is measured at 23° C. under a shear gradient of 1000 s$^{-1}$.

3. Thermosetting composition according to claim 1, characterized in that the said reactive diluent b) comprises:
   b1) a monomer comprising:
      b1a) at least one aromatic vinyl or allyl monomer chosen from the group consisting of: styrene, vinyltoluenes, tert-butylstyrene, divinylbenzenes, divinyltoluenes and diallyl phthalates, and optionally
      b1b) at least one monofunctional (meth)acrylic monomer, and optionally
   b2) at least one polyfunctional (meth)acrylic monomer comprising at least 2 (meth)acrylic functional groups.

4. Thermosetting composition according to claim 3, characterized in that the level by weight of b2) is from 2 to 40% of the total weight of the component b).

5. Thermosetting composition according to claim 3, characterized in that the said polyfunctional (meth)acrylic monomer b2) is selected from the group consisting of: butanediol di(meth)acrylate (BDD(M)A), (1,3-)butane glycol di(meth)acrylate (BGD(M)A), trimethylolpropane tri(meth)acrylate (TMPT(M)A), ethylene glycol di(meth)acrylate (EGD(M)A), diethylene glycol di(meth)acrylate (DEGD(M)A), hexamethylene glycol di(meth)acrylate (HMD(M)A), pentaerythritol tetra(meth)acrylate (PETT(M)A), and neopentyl glycol di(meth)acrylate (NPGD(M)A).

6. Thermosetting composition according to claim 3, characterized in that the said polyfunctional (meth)acrylic monomer b2) is 1,4-butanediol di(meth)acrylate (BDD(M)A).

7. Thermosetting composition according to claim 3, characterized in that the said polyfunctional (meth)acrylic monomer b2) is a methacrylic monomer.

8. Thermosetting composition according to claim 1, characterized in that the said unsaturated polyester a1) is based on an acid component composed of 60 to 100 mol % of maleic acid and/or anhydride, the remainder with respect to 100% being at least one of orthophthalic acid, isophthalic acid and anhydride thereof.

9. Thermosetting composition according to claim 1, characterized in that the polyol component of the said polyester is composed of 70 to 100 mol % of propylene glycol (PG).

10. Thermosetting composition according to claim 1, characterized in that the said polyester a1) is based on an acid component composed of 100 mol % of at least one of maleic acid and an anhydride thereof, and on a polyol component composed of 100 mol % of propylene glycol (PG).

11. Thermosetting composition according to claim 1, characterized in that the said resin a) is selected from the said polyesters a1).

12. Thermosetting composition according to claim 1, characterized in that the said resin a) is selected from the combinations of at least one polyester a1) with at least one vinyl ester a2).

13. Thermosetting composition according to claim 1, characterized in that it comprises a component d) at a level by weight ranging up to 250 parts per 100 parts of the said resin a).

14. Thermosetting composition for the preparation of a thermosetting composition as defined according to claim 1, characterized in that it comprises the components a) and b).

15. Process for the preparation of a thermosetting composition as defined according to claim 1, characterized in that it comprises the stage of mixing a composition comprising components a) and b) with said components c) to i).

16. Moulding composition for composite components or application composition for laminates, structural adhesive, mastic, polyester concrete, gel coat or top coat composition, characterized in that it comprises the thermosetting composition as defined according to claim 1.

17. Composition according to claim 16, characterized in that it is a moulding composition for composite components selected from the group consisting of: BMC, AMC and CIC.

18. Composition according to claim 16, characterized in that it is an application composition for laminates and composite components by the pultrusion route or by casting, spraying, contact, infusion, centrifuging, injection/compression moulding (RTM), filament winding or continuous impregnation.

19. Composition according to claim 16, characterized in that it is a structural adhesive composition for the assembling of composite components.

20. Composition according to claim 16, characterized in that it is a gel coat or top coat composition, which is optionally pigmented.

21. Thermosetting composition as defined according to claim 1, characterized in that the composition is formulated for manufacture of a material selected from the group consisting of moulded composite components, laminated composite components, structural adhesives, mastics, gel coats or top coats, which are fire resistant.

22. Moulded or laminated composite components, coatings or applications of structural adhesives or of mastics or of gel coats or of top coats, characterized in that the said components or the said coatings or applications of adhesives or of mastic or of gel coats or of top coats result from the crosslinking of the thermosetting composition as defined according to claim 1.

23. Moulded or laminated composite components, coatings or applications as defined according to claim 22, characterized in that the components, coatings or applications have a intumescent fire-retardant behaviour meeting at least the HL2 level and optionally the HL3 level according to the R1 requirement of Standard prCEN/TS 45545-2:2008.

24. Moulded or laminated composite components, coatings or applications of structural adhesives or of mastics or of gel coats or of top coats, characterized in that the said components or the said coatings or the said applications of adhesives or of mastic or of gel coats or of top coats result from the crosslinking of at least one thermosetting composition as defined according to claim 1.

25. Moulded or laminated composite components, coatings or applications as defined according to claim 24, characterized in that they have a fire-retardant behaviour meeting the M1F1 criterion according to Standard NF 16-101 and optionally at least the HL2 level according to the R1 requirement of prCEN/TS 45545-2:2008.

26. Gels coats or top coats according to claim 22, characterized in that said coats have an intumescent fire-retardant behaviour meeting at least the HL2 level and optionally the HL3 level according to the R1 requirement of Standard prCEN/TS 45545-2:2008.

27. Thermosetting composition according to claim 4, characterized in that said polyfunctional (meth)acrylic monomer comprises from 2 to 4 (meth)acrylic functional groups.

* * * * *